United States Patent
Benzler et al.

(10) Patent No.: US 12,187,257 B2
(45) Date of Patent: Jan. 7, 2025

(54) CONTROL DEVICE AND METHOD FOR ELECTRICALLY SWITCHING A TWO-STAGE SOLENOID VALVE

(71) Applicant: Robert Bosch GmbH, Stuttgart (DE)

(72) Inventors: Steffen Benzler, Eberdingen (DE);
Yasutaka Nagakura, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 664 days.

(21) Appl. No.: 17/252,876

(22) PCT Filed: Jun. 6, 2019

(86) PCT No.: PCT/EP2019/064797
§ 371 (c)(1),
(2) Date: Dec. 16, 2020

(87) PCT Pub. No.: WO2020/011455
PCT Pub. Date: Jan. 16, 2020

(65) Prior Publication Data
US 2021/0245722 A1     Aug. 12, 2021

(30) Foreign Application Priority Data
Jul. 13, 2018   (DE) .......................... 102018211686.5

(51) Int. Cl.
*B60T 8/36*     (2006.01)
*B60T 8/17*     (2006.01)
*F16K 31/06*    (2006.01)

(52) U.S. Cl.
CPC .......... *B60T 8/363* (2013.01); *F16K 31/0675* (2013.01); *B60T 8/17* (2013.01); *B60Y 2400/81* (2013.01)

(58) Field of Classification Search
CPC .......... B60T 8/36; B60T 8/3615; B60T 8/363; B60T 8/3655; B60T 8/17; B60T 2270/84;
(Continued)

(56) References Cited

U.S. PATENT DOCUMENTS 4,266,261 A * 5/1981 Streit ...................... F02D 41/20
                                              361/194
4,823,825 A * 4/1989 Buchl ................... H01F 7/1844
                                              361/170

(Continued)

FOREIGN PATENT DOCUMENTS

CN   102119095 A    7/2011
CN   102169746 A    8/2011
(Continued)

OTHER PUBLICATIONS

EPO translation EP 1796945 B1. (Year: 2008).*
(Continued)

*Primary Examiner* — Thomas J Williams
(74) *Attorney, Agent, or Firm* — NORTON ROSE FULBRIGHT US LLP; Gerard A. Messina

(57) ABSTRACT

A control device for a two-stage solenoid valve, including an activation unit which outputs a current flowing through a solenoid coil of the solenoid valve as a switching signal. The solenoid valve is switchable from its de-energized switching state into its energized switching state by increasing a current intensity of the switching signal from zero to a switching current intensity. The solenoid valve is switchable from its energized switching state into its de-energized switching state by designing the activation unit to set the current intensity of the switching signal during a switching time interval to at least one current intensity value between zero and the switching current intensity, reduce it to zero after the switching time interval and during the switching time interval, increase it at least twice, each for a predefined (Continued)

pulse time interval, to a predefined current pulse value between zero and the switching current intensity.

10 Claims, 2 Drawing Sheets

(58) Field of Classification Search
CPC ... F16K 31/0675; F16K 31/06; F16K 31/0679
See application file for complete search history.

(56) References Cited

U.S. PATENT DOCUMENTS

| | | | |
|---|---|---|---|
| 5,645,097 A | 7/1997 | Zechmann et al. | |
| 6,019,441 A * | 2/2000 | Lloyd | B60T 8/36 303/157 |
| 6,744,615 B1 * | 6/2004 | Melbert | H01F 7/1811 361/187 |
| 8,254,077 B2 * | 8/2012 | Fukano | H01F 7/1844 361/139 |
| 9,201,427 B2 * | 12/2015 | Kraft | F02D 41/2464 |
| 2005/0006951 A1 | 1/2005 | Schwarzer et al. | |
| 2013/0147260 A1 * | 6/2013 | Loos | B60T 13/686 303/20 |

FOREIGN PATENT DOCUMENTS

| | | | |
|---|---|---|---|
| CN | 102325676 A | 1/2012 | |
| DE | 102007015265 A1 * | 10/2007 | B60T 8/36 |
| DE | 102010029384 A1 | 12/2011 | |
| DE | 102016226272 A1 | 6/2017 | |
| DE | 102016124122 A1 | 6/2018 | |
| EP | 1130300 A1 | 9/2001 | |
| EP | 1796945 B1 * | 3/2008 | B60T 8/36 |
| JP | 2012015146 A | 1/2012 | |
| JP | 2015179417 A | 10/2015 | |

OTHER PUBLICATIONS

DE-102007015265-A1 (Year: 2007), Translation.*
International Search Report for PCT/EP2019/064797, Issued Aug. 16, 2019.

* cited by examiner

CONTROL DEVICE AND METHOD FOR ELECTRICALLY SWITCHING A TWO-STAGE SOLENOID VALVE

FIELD

The present invention relates to a control device for a two-stage solenoid valve. The present invention also relates to a braking system for a vehicle. In addition, the present invention relates to a method for electrically switching a two-stage solenoid valve.

BACKGROUND INFORMATION

A method and a device for activating a solenoid valve used as a brake valve in a braking system of a motor vehicle are described in German Patent Application No. DE 10 2016 226 272 A1. The solenoid valve is selectively switchable as a two-stage solenoid valve into its de-energized open switching state or into its energized closed switching state. By increasing a current intensity of a current through a solenoid coil of the solenoid valve, the solenoid valve is thus switched into its energized closed switching state, whereas the solenoid valve is switchable into its de-energized open state with the aid of a reduction of the current intensity of the current through its solenoid coil. During the activation of the solenoid valve described in German Patent Application No. DE 10 2016 226 272 A1, a so-called comfort pulse is also conducted through its solenoid coil during the variation of the current intensity of the current for switching the solenoid valve, as a result of which an emission of an audible noise during the switching of the solenoid valve should be reducible.

SUMMARY

The present invention provides a control device for a two-stage solenoid valve, a braking system for a vehicle, and a method for electrically switching a two-stage solenoid valve.

The present invention provides improved possibilities for switching a two-stage solenoid valve, which is only switchable into its de-energized switching state or into its energized switching state, from its energized switching stage into its de-energized switching stage in that an undesirably strong acceleration of an adjustable valve element of the solenoid valve during the switching interval is counteracted by increasing the current intensity of the switching signal at least twice, each for the predefined pulse time interval, to the predefined current pulse value in such a way that a hard and loud striking of the adjustable valve element (for example, at a valve seat of the solenoid valve) is prevented. The present invention thus improves the NVH behavior (noise vibration harshness) during the switching of the solenoid valve. So-called "valve switching noises" or "valve knocking noises" are thus reduced/eliminated during the switching of the solenoid valve according to the present invention.

In one advantageous specific embodiment of the control device in accordance with the present invention, the activation device is designed to increase the current intensity of the switching signal during the switching time interval at least three times, each for the predefined pulse time interval, to the predefined current pulse value. The comparatively high number of pulse intervals executed during the switching time interval permits a rapid switch between a pulse time interval and a subsequent intermediate time interval, or between an intermediate time interval and a subsequent pulse time interval. With the aid of the comparatively frequent switchover between the two different interval types, it is possible to reliably adjust the adjustable valve element for switching the solenoid valve while simultaneously preventing an undesirable high acceleration of the adjustable valve element.

The activation device is preferably also designed to set during the switching time interval the current intensity of the switching signal during each intermediate time interval between two successive pulse time intervals to a respective intermediate value in such a way that each of the intermediate values is greater than an intermediate value of a subsequent intermediate time interval subsequently maintained in the same switching time interval. The current intensity of the switching signal may thus be reduced during the intermediate time intervals according to a predefined function, whereas between the intermediate time intervals the pulse time intervals counteract an undesirably strong acceleration of the adjustable valve element. This improves the NVH behavior of the solenoid valve when switching from its energized switching stage into its de-energized switching state, while at the same time the desired switching of the solenoid valve remains reliably implementable.

The above-described advantages may be ensured, in particular, in a braking system for a vehicle including such a control device and the two-stage solenoid valve activatable with the aid of the control device. As a result of the "valve switching noises" or "valve knocking noises" reduced/eliminated with the aid of the advantageous design of the control device during the switching of the two-stage solenoid valve from its energized switching state into its de-energized switching state, there is no need to fear irritating persons in the vehicle as a result of such noises. Equipping the braking system with the control device thus increases a comfort level of the persons in the vehicle.

The two-stage solenoid valve may, for example, be a currentless closed solenoid valve or a currentless open solenoid valve. The two-stage solenoid valve may also be a wheel inlet valve or a wheel outlet valve. Thus, the present invention may be advantageously utilized for a multitude of frequently used valve types. It is noted, however, that a designability of the two-stage solenoid valve is not limited to wheel inlet valves or wheel outlet valves.

The above-described advantages are also achievable with the aid of an implementation of a corresponding method for electrically switching a two-stage solenoid valve, in accordance with the present invention. It is expressly noted that the method for electrically switching a two-stage solenoid valve according to the specific embodiments of the control device and/or of the braking system explained above is refinable.

BRIEF DESCRIPTION OF THE DRAWINGS

Further features and advantages of the present invention are explained below with reference to the figures.

DETAILED DESCRIPTION OF EXAMPLE EMBODIMENTS

Figure 1A:
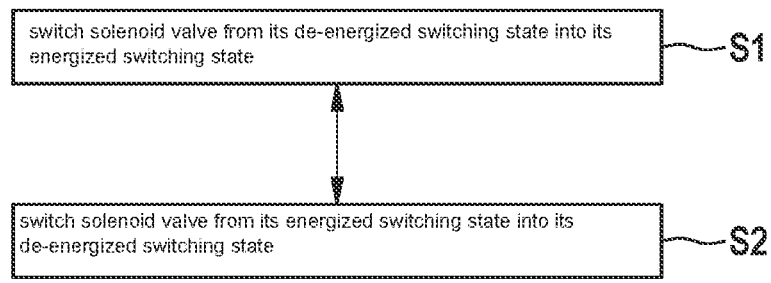
FIGS. 1a and 1b show a flowchart and a coordinate system for explaining one specific embodiment of the method for electrically switching a two-stage solenoid valve, in accordance with the present invention.
Figure 1B:
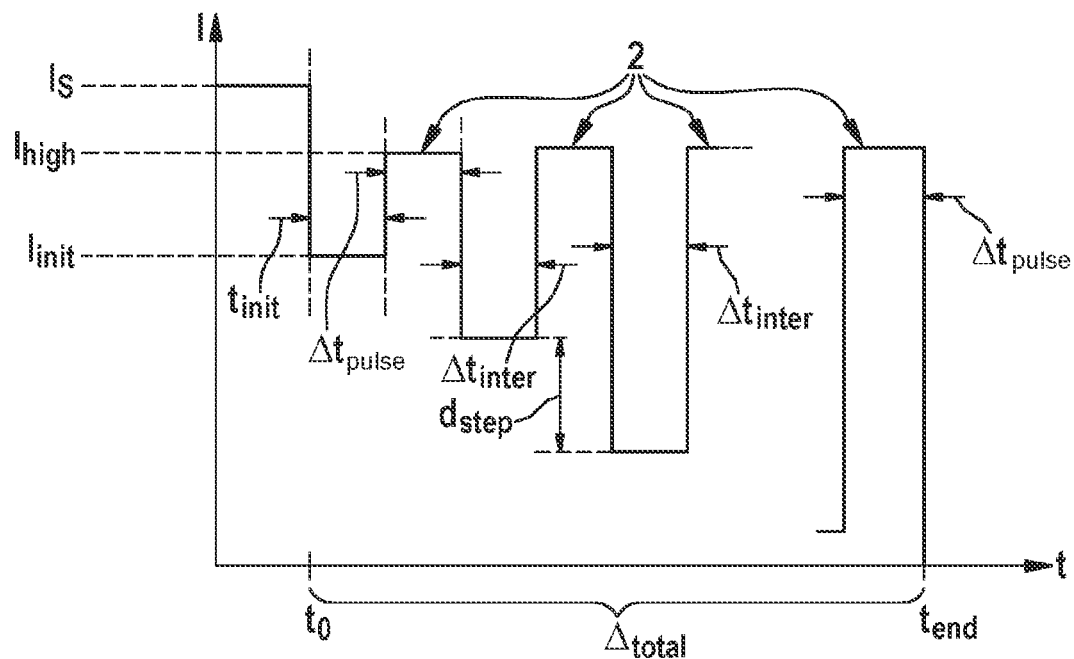

FIGS. 1a and 1b show a flowchart and a coordinate system for explaining one specific embodiment of the method for electrically switching a two-stage solenoid valve.

The two-stage solenoid valve electrically switched with the aid of the method described below is understood to mean a switching valve, which is switchable only into its energized switching state or into its de-energized switching state. Thus, the two-stage solenoid valve is able only to be switched back and forth between these two switching states. The two-stage solenoid valve is closed either in its energized switching state or in its de-energized switching state, while the two-stage solenoid valve is open in the other of the two switching states. The two-stage solenoid valve may thus be a currentless closed solenoid valve or a currentless open solenoid valve.

The method described below is preferably designed for electrically switching a two-stage solenoid valve of a braking system of a vehicle/motor vehicle. The advantages of the method described below may thus be utilized in spatial surroundings, in which persons present are easily irritated by noises. For example, the two-stage solenoid valve in the form of a wheel inlet valve or a wheel outlet valve of the braking system may be electrically switched. It is noted, however that a feasibility of the method described below is limited neither to particular, spatial surroundings nor to a specific valve type.

In a method step S1 of the method for electrically switching the two-stage solenoid valve, the solenoid valve is switched from its de-energized switching state into its energized switching state. This occurs by increasing a current intensity I of a current flowing through at least one solenoid coil of the solenoid valve as a switching signal from (almost) zero to a switching current intensity $I_s$ greater than or equal to a holding current predefined by the design of the solenoid valve. The holding current is understood to mean a current intensity just sufficient enough, with the aid of which the solenoid valve is switchable/maintainable from its de-energized switching state into its energized switching state. The current flowing through the at least one solenoid coil of the solenoid valve having a switching current intensity $I_s$, effectuates a magnetic field, which is sufficient for adjusting an adjustable valve element of the solenoid valve from its initial position corresponding to the de-energized switching state into an end position corresponding to the energized switching state, at least one spring of the solenoid valve counteracting the adjusting movement of the adjustable valve element from the initial position into the end position.

In a method step S2 alternatingly carried out with method step S1, the solenoid valve is switched from its energized switching state into its de-energized switching state. This occurs by setting current intensity I of the switching signal during a switching time interval $\Delta_{total}$ to at least one current intensity value between zero and switching current intensity $I_s$ and by reducing current intensity I of the switching signal after switching time interval $\Delta_{total}$ to (almost) zero. In addition, current intensity I of the switching signal is increased during switching time interval $\Delta_{total}$ at least twice, each for a predefined pulse time interval $\Delta t_{pulse}$, to a predefined current pulse value $I_{high}$ between zero and switching current intensity $I_s$. In the times of switching time interval $\Delta_{total}$ outside pulse time intervals $\Delta t_{pulse}$ on the other hand, current intensity I of the switching signal is set to at least one current intensity value greater than zero and less than predefined current pulse value $I_{high}$.

FIG. 1b shows a coordinate system, whose abscissa is a time axis t, while current intensity I of the current conducted as switching signal through the at least one solenoid coil of the solenoid valve is represented with the aid of the ordinate of the coordinate system.

For example, during the times t from 0 to a point in time $t_0$, the solenoid valve is held in its energized switching state with the aid of switching current intensity $I_s$ of 250 mA (milliamperes).

The implementation of method step S2 is started from time $t_0$ by setting current intensity I of the switching signal during subsequent switching time interval $\Delta_{total}$ between times $t_0$ and $t_{end}$ to the at least one current intensity value between (almost) zero and switching current intensity $I_s$. During switching time interval $\Delta_{total}$, at least two so-called high current pulses 2 are also conducted through the at least one solenoid coil of the solenoid valve by increasing current intensity I of the switching signal at least twice, each for predefined pulse time interval $\Delta t_{pulse}$, to predefined current pulse value $I_{high}$ between zero and predefined switching current intensity $I_s$. Current pulse value $I_{high}$ may, for example, be 120 mA (milliamperes).

During switching time interval $\Delta_{total}$, current intensity I of the switching signal is at least temporarily no longer sufficient to effectuate the magnetic field counteracting the at least one spring of the solenoid valve. The adjustable valve element of the solenoid valve is therefore pressed by the at least one spring from its end position again in the direction toward its initial position. The at least two high current pulses 2 conducted through the at least one solenoid coil of the solenoid valve during switching time interval $\Delta_{total}$ effectuate, however, a short-term "recovery" of the magnetic field, or a short-term increase of its magnetic force, as a result of which the effect of the at least one spring with respect to an acceleration of the adjustable valve element of the solenoid valve is temporarily weakened. The at least two high current pulses 2 carried out during switching time interval $\Delta_{total}$ thus effectuate a slight delay of the valve element driven with the aid of the at least one spring. The at least two high current pulses 2 thereby counteract an undesirably strong acceleration of the adjustable valve element. A hard or loud striking of the valve element adjusted with the aid of the at least one spring in its initial position (for example, at a valve seat of the solenoid valve) may thus be prevented with the aid of the at least two high current pulses 2. Thus, there is also no need to fear any "valve switching noises" or "valve knocking noises" during the implementation of method step S2. Persons in spatial surroundings of the solenoid valve such as, for example, occupants of a vehicle/motor vehicle equipped with the solenoid valve are therefore also not irritated by such noises. With the aid of the at least two high current pulses 2, it is possible to reduce undesirable "valve switching noises" or "valve knocking noises" by at least 50% as compared to the related art.

During switching time interval $\Delta_{total}$, current strength I of the switching signal is preferably increased at least three times each for predefined pulse time interval $\Delta t_{pulse}$, to predefined current pulse value $I_{high}$. As a result of a high number of high current pulses 2 conducted through the at least one solenoid coil of the solenoid valve during switching time interval $\Delta_{total}$, it is possible to comparatively quickly and relatively frequently switchover between pulse time intervals $\Delta t_{pulse}$ and so-called intermediate time intervals $\Delta t_{inter}$, each intermediate time interval $\Delta t_{inter}$ being limited by two successive pulse time intervals $\Delta t_{pulse}$. Each pulse time interval $\Delta t_{pulse}$ may thus have a relatively short duration between 1 ms (millisecond) and 10 ms (milliseconds), for example, a duration of 5 ms (milliseconds). Each intermediate time interval $\Delta t_{inter}$ may accordingly also have a comparatively short duration between 1 ms (millisecond) and 10 ms (milliseconds), for example, a duration of 5 ms (milliseconds). The frequent switchover between pulse time intervals $\Delta t_{pulse}$ and intermediate time intervals $\Delta t_{inter}$ effected in this way reliably counteracts an excessively strong acceleration of the adjustable valve element of the solenoid valve during its adjusting movement from the end position into the initial position.

In the specific embodiment of the method depicted with the aid of FIGS. 1a and 1b, current intensity I of the switching signal is set during each intermediate time interval $\Delta t_{inter}$ to a respective intermediate value in such a way that each of the intermediate values is greater than an intermediate value of a subsequent intermediate time interval $\Delta t_{inter}$ subsequently maintained in the same switching time interval $\Delta t_{total}$. For example, the respective intermediate value between two successive intermediate time intervals $\Delta t_{inter}$ may be gradually reduced by a permanently predefined step height $d_{step}$. Step height $d_{step}$ may, for example, be 15 mA (milliamperes). In this way, it is ensurable that despite the comparatively frequent implementation of high current pulses 2, the solenoid valve is reliably switched from its energized switching state into its de-energized switching state and still, no "valve switching noises" or "valve knocking noises" are to be feared. One further advantage of the gradual reduction of the intermediate value respectively maintained in intermediate time intervals $\Delta t_{inter}$ by step height $d_{step}$ is that in this specific embodiment, the holding current, above which the solenoid valve is switchable/maintainable from its de-energized switching state into its energized switching state, need not be known.

As is apparent based on the coordinate system of FIG. 1b, current intensity I, starting initially from switching current intensity $I_s$, may first be reduced at the beginning of switching time interval $\Delta_{total}$ to an initial current intensity $I_s$ for a predefined time span $t_{init}$. Once predefined time span $t_{init}$ has expired, first high current pulse 2 is then implemented. Initial current intensity $I_{init}$ may, for example, be 80 mA (milliamperes). Predefined time span $t_{init}$ may, for example, be 5 ms (milliseconds). In first intermediate time interval $\Delta t_{inter}$ following first high current impulse 2, current intensity I may then be reduced compared to initial current intensity $I_{init}$ by step height $d_{step}$.

Figure 2:
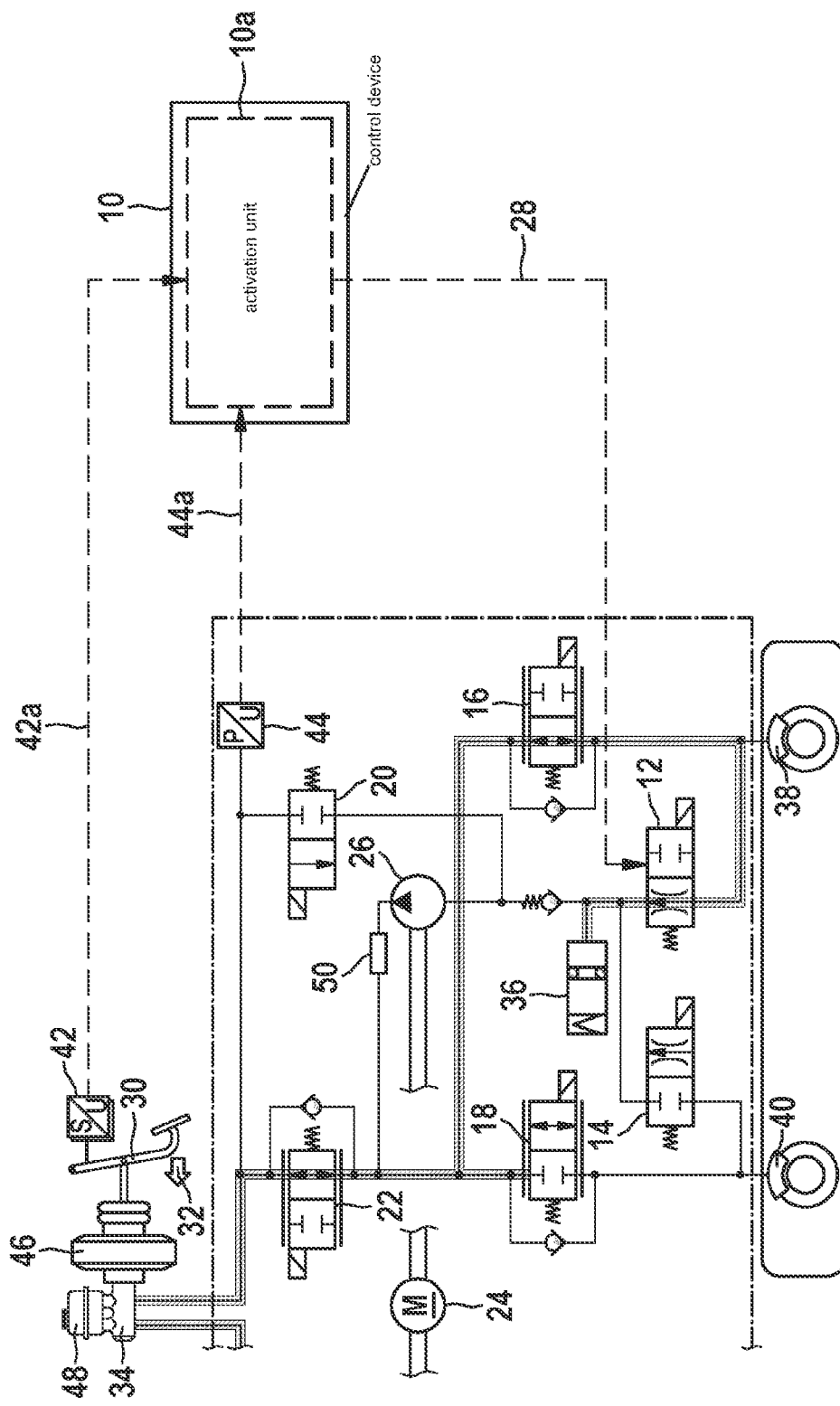
FIG. 2 schematically shows a representation of the control device and of a braking system for a vehicle equipped therewith, in accordance with an example embodiment of the present invention.

FIG. 2 schematically shows a representation of the control device or of a braking system equipped therewith for a vehicle.

Control device 10 schematically depicted in FIG. 2 is designed to electrically switch a two-stage solenoid valve 12. The two-stage design of solenoid valve 12 is understood to mean that solenoid valve 12 is switchable only into its de-energized switching state or into its energized switching state. Thus, solenoid valve 12 outlined in FIG. 2 as currentless closed solenoid valve 12 may also be a currentless open solenoid valve in another specific embodiment.

In the example of FIG. 2, two-stage solenoid valve 12 switchable with the aid of control device 10 is, for example, a valve of a braking system for a vehicle, control device 10 may also be a component of the braking system. It is noted, however, that a usability of control device 10 is not limited to a particular intended purpose of solenoid valve 12 switchable therewith. Even the design of solenoid valve 12 as wheel outlet valve 12 and 14 switchable with the aid of control device 10 is to be interpreted as merely exemplary. For example, a wheel inlet valve 16 and 18, a high pressure switching valve 20 and/or a switchover valve 22 may be activatable with the aid of control device 10. Moreover, a functionality of control device 10 is also not limited to the electrical switching of only the one solenoid valve 12, as is visually depicted in FIG. 2. Instead, multiple valves such as, for example, all valves 12 through 22 of the braking system are switchable with the aid of the approach described below. Although only one brake circuit of the braking system is depicted in FIG. 2, valves 12 through 22 of multiple brake circuits may also be switched with the aid of control device 10. Further components of the braking system outlined in FIG. 2 such as, for example, a pump motor 24 of at least one pump 26, may be switchable with the aid of control device 10.

Control device 10 includes an activation unit 10a, which is designed to output a current flowing through at least one solenoid coil of solenoid valve 12 as switching signal 28 to solenoid valve 12. Solenoid valve 12 is switchable from its de-energized switching state into its energized switching state with the aid of activation device 10a by designing activation unit 10a, if necessary, to increase a current intensity of switching signal 28 from (almost) zero to a switching current intensity greater than-equal to a holding current predefined by the design of the solenoid valve, with the aid of which solenoid valve 12 is switchable from its de-energized switching state into its energized switching state. The currentless closed solenoid valve 12 may be switched from its de-energized switching state into its energized switching state with the aid of activation unit 10a, for example, as a driver forces brake fluid from a downstream main brake cylinder 34 into at least one connected brake circuit with the aid of his/her driver brake force 32 applied to a brake actuation element 30. With the aid of the switching of currentless closed solenoid valve 12 into its energized switching state, it is possible in this case to limit or prevent a pressure build-up in at least one wheel brake cylinder 38 and 40 of the respective brake circuit due to the resultant displacement of the brake fluid forced into the respective brake circuit via switched open, currentless closed solenoid valve 12 into a downstream reservoir chamber/low-pressure reservoir chamber 36 (see FIG. 2). The actuation of brake actuation element 30 by the driver may be indicated to control device 10 with the aid of at least one sensor signal 42a of a brake actuation element sensor 42. Control device 10 may also be designed to verify the limitation/prevention of the brake pressure build-up in the respective brake circuit based on at least one sensor signal 44a of at least one pressure sensor 44. The example of a "regenerative braking" with the aid of the switching of currentless closed solenoid valve 12 described herein is not to be interpreted as restrictive.

Solenoid valve 12 is also switchable from its energized switching state into its de-energized switching state with the aid of activation unit 10a by designing activation device 10a, if necessary, to set the current intensity of switching signal 28 during a switching time interval to at least one current intensity value between zero and the switching current intensity and to reduce it after the switching time interval to (almost) zero.

Activation unit 10a is specifically designed to increase the current intensity during the switching time interval at least twice, each for a predefined pulse time interval, to a predefined current pulse value between zero and the switching current intensity and to set the current intensity of the switching signal in the times of the switching time interval outside the pulse time intervals to at least one current intensity value greater than zero and less than the predefined current pulse valve. Thus, control device 10 also yields the advantages of the above-explained method.

Control device 10/its activating unit 10a may, in particular, be designed to carry out the above-described method. For example, activation device 10a may be designed to increase the current intensity of the switching signal during the switching time interval at least three times, each for the predefined pulse time interval, to the predefined current pulse value. Activation unit 10a is preferably also designed to set the current intensity of the switching signal during the switching time interval to a respective intermediate value during each intermediate time interval between two successive pulse time intervals in such a way that each of the intermediate values is greater than an intermediate value of a subsequent intermediate time interval maintained in the same switching time interval.

A braking system including control device 10 also yields the above-described advantages. It is expressly noted, however, that the design of such a braking system including control device 10 visually depicted in FIG. 2 is to be interpreted as merely exemplary. Components 14 through 44, as well as brake booster 46, a brake fluid reservoir 48 and a filter 50 are also only examples of braking system components of such a braking system.

What is claimed is:

1. A control device for a two-stage solenoid valve, comprising:
    an activation unit configured to output a current flowing through at least one solenoid coil of the solenoid valve as a switching signal to the solenoid valve, the solenoid valve being switchable from its de-energized switching state into its energized switching state, using the activation unit, the activation unit being configured to increase a current intensity of the switching signal from zero to a switching current intensity greater than or equal to a holding current predefined by the solenoid valve, using which the solenoid valve is switchable from an initial position in its de-energized switching state into an end position in its energized switching state, and the solenoid valve being switchable from its energized switching state into its de-energized switching state using the activation unit, the activation unit being configured to reduce the current intensity of the switching signal during a switching time interval to at least a current intensity value between zero and the switching current intensity;
    wherein the activation unit is configured to increase the current intensity of the switching signal during the switching time interval at least twice, each for a predefined pulse time interval, to a predefined current pulse value between zero and the switching current intensity, and in times of the switching time interval outside the pulse time intervals, to set the current intensity of the switching signal to at least one current intensity value greater than zero and less than the predefined current pulse value;
    wherein a falling edge of the predefined current pulse value for a last one of the predefined pulse time intervals is reduced to zero, the falling edge coinciding with an endpoint of the switching time interval;
    wherein the switching current intensity is applied to the solenoid valve before a beginning of the switching time interval;
    the predefined current pulse value applied during the switching time interval is less than the switching current intensity;
    wherein the predefined current pulse value is inadequate to achieve the end position for the energized switching state of the solenoid valve;
    wherein the predefined current pulse is sufficient to generate during each predefined pulse interval of the switching time interval a magnetic force in the solenoid valve that counteracts an acceleration of an adjustable valve element of the solenoid valve toward the initial position due to an action of a spring of the solenoid valve that is oriented for moving the adjustable valve element to the initial position.

2. The control device as recited in claim 1, wherein the activation unit is configured to increase the current intensity of the switching signal during the switching time interval at least three times, each for the predefined pulse time interval, to the predefined current pulse value.

3. The control device as recited in claim 2, wherein the activation device is configured to set the current intensity of the switching signal during the switching time interval to a respective intermediate value during each intermediate time interval between two successive pulse time intervals in such a way that each of the intermediate values is greater than an intermediate value of a subsequent intermediate time interval maintained in the same switching time interval.

4. A braking system for a vehicle, comprising:
    a control device; and
    a two-stage solenoid valve activatable using the control device;
    wherein the control device includes an activation unit configured to output a current flowing through at least one solenoid coil of the solenoid valve as a switching signal to the solenoid valve, the solenoid valve being switchable from its de-energized switching state into its energized switching state, using the activation unit, the activation unit being configured to increase a current intensity of the switching signal from zero to a switching current intensity greater than or equal to a holding current predefined by the solenoid valve, using which the solenoid valve is switchable from its de-energized switching state into its energized switching state, and the solenoid valve being switchable from its energized switching state into its de-energized switching state using the activation unit, the activation unit being configured to reduce the current intensity of the switching signal during a switching time interval to at least a current intensity value between zero and the switching current intensity;
    wherein the activation unit is configured to increase the current intensity of the switching signal during the switching time interval at least twice, each for a predefined pulse time interval, to a predefined current pulse value between zero and the switching current intensity, and in times of the switching time interval outside the pulse time intervals, to set the current intensity of the switching signals to at least one current intensity value greater than zero and less than the predefined current pulse value;
    wherein a falling edge of the predefined current pulse value for a last one of the predefined pulse time intervals is reduced to zero, the falling edge coinciding with an endpoint of the switching time interval;
    wherein the switching current intensity is applied to the solenoid valve before a beginning of the switching time interval;
    the predefined current pulse value applied during the switching time interval is less than the switching current intensity;

wherein the predefined current pulse value is inadequate to achieve the end position for the energized switching state of the solenoid valve;

wherein the predefined current pulse is sufficient to generate during each predefined pulse interval of the switching time interval a magnetic force in the solenoid valve that counteracts an acceleration of an adjustable valve element of the solenoid valve toward the initial position due to an action of a spring of the solenoid valve that is oriented for moving the adjustable valve element to the initial position.

5. The braking system as recited in claim 4, wherein the two-stage solenoid valve is a currentless closed solenoid valve or a currentless open solenoid valve.

6. The braking system as recited in claim 4, wherein the two-stage solenoid valve is a wheel inlet valve or a wheel outlet valve.

7. A method for electrically switching a two-stage solenoid valve, comprising the following steps:

switching the solenoid valve from its de-energized switching state into its energized switching state by increasing a current intensity of a current flowing through at least one solenoid coil of the solenoid valve as a switching signal from zero to a switching current intensity greater than or equal to a holding current predefined by the solenoid valve, using which the solenoid valve is switched from its de-energized switching state into its energized switching state; and switching the solenoid valve from its energized switching state into its de-energized switching state by setting the current intensity of the switching signal during a switching time interval to at least one current intensity value between zero and the switching current intensity and reducing the current intensity of the switching signal;

wherein during the switching time interval, the current intensity of the switching signal is increased at least twice, each for a predefined pulse time interval, to a predefinable current pulse value between zero and the switching current intensity, and in times of the switching time interval outside the pulse time interval, the current intensity of the switching signal is set to at least one current intensity value greater than zero and less than the predefined current pulse value;

wherein a falling edge of the predefined current pulse value for a last one of the predefined pulse time intervals is reduced to zero, the falling edge coinciding with an endpoint of the switching time interval;

wherein the switching current intensity is applied to the solenoid valve before a beginning of the switching time interval;

the predefined current pulse value applied during the switching time interval is less than the switching current intensity;

wherein the predefined current pulse value is inadequate to achieve the end position for the energized switching state of the solenoid valve;

wherein the predefined current pulse is sufficient to generate during each predefined pulse interval of the switching time interval a magnetic force in the solenoid valve that counteracts an acceleration of an adjustable valve element of the solenoid valve toward the initial position due to an action of a spring of the solenoid valve that is oriented for moving the adjustable valve element to the initial position.

8. The method as recited in claim 7, wherein during the switching time interval, the current intensity of the switching signal is increased at least three times, each for the predefined pulse time interval, to the predefined current pulse value.

9. The method as recited in claim 8, wherein during the switching time interval, the current intensity of the switching signal during each intermediate time interval between two successive pulse time intervals is set to a respective intermediate value in such a way that each of the intermediate values is greater than an intermediate value of a subsequent intermediate time interval subsequently maintained in the same switching time interval.

10. The method as recited in claim 7, wherein the solenoid valve is a two-stage solenoid valve of a braking system of a vehicle, the solenoid valve being a wheel inlet valve and/or a wheel outlet valve.

\* \* \* \* \*